United States Patent
Aling

[11] 3,852,639
[45] Dec. 3, 1974

[54] VISUAL DISPLAY APPARATUS

[75] Inventor: Willem Aling, Emmasingel, Eindhoven, Netherlands

[73] Assignee: U.S. Phillips Corporation, New York, N.Y.

[22] Filed: May 7, 1973

[21] Appl. No.: 357,649

[30] Foreign Application Priority Data
June 17, 1972 Netherlands .................. 7208319

[52] U.S. Cl. ............... 315/84.6, 315/235, 315/295, 315/336
[51] Int. Cl. .......................................... H05b 41/36
[58] Field of Search .......... 315/84.6, 233, 234, 235, 315/323, 291, 294, 295, 299, 335, 336

[56] References Cited
UNITED STATES PATENTS

| | | | |
|---|---|---|---|
| 2,505,006 | 4/1950 | Reeves | 315/84.6 |
| 2,516,915 | 8/1950 | Reeves | 315/84.6 |
| 3,777,213 | 12/1973 | Hankins et al. | 315/323 |

Primary Examiner—Alfred L. Brody
Attorney, Agent, or Firm—Frank R. Trifari; Bernard Franzblau

[57] ABSTRACT

A voltage provision for a gas discharge display tube which is stabilized with the aid of the extinction voltage of the tube at a value admitting the smallest possible control voltages. The extinction voltage of the tube is measured with the aid of a capacitor connected to an electrode of the tube.

14 Claims, 1 Drawing Figure

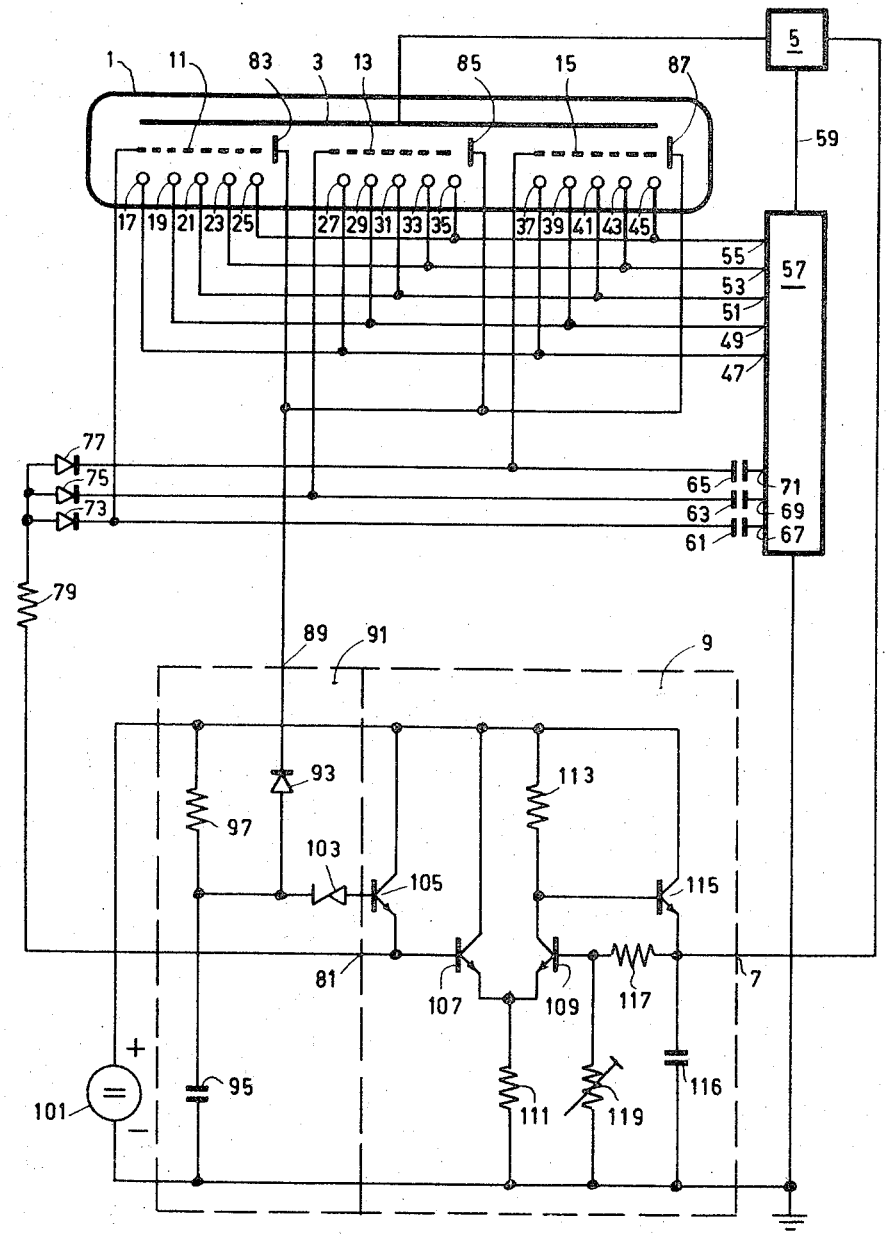

VISUAL DISPLAY APPARATUS

The invention relates to a visual display apparatus comprising a gas discharge display tube and a bias control circuit for controlling a supply voltage for the gas discharge display tube, said bias control circuit being coupled to a reference voltage measuring circuit.

Visual display apparatus of the kind described above are known from Philips Application Information 334 in which the reference voltage measuring circuit is a zener diode circuit. Due to tolerances in zener diodes and gas discharge display tubes the controlled bias voltage obtained in such a circuit is generally lower than is strictly necessary so that for switching on and switching off discharge trajectories in the display tube the transistors used must be suitable for a higher operating voltage than might be expected on the ground of the properties of the gas discharge tubes alone.

An object of the invention is to obviate this drawback.

To this end a visual display apparatus of the kind described in the preamble, and in accordance with the invention, is characterized in that the reference voltage measuring circuit is an extinction voltage measuring circuit which includes a capacitor coupled to an extinction voltage measuring electrode of the gas discharge display tube, said extinction voltage measuring electrode being arranged as a recharge electrode for the capacitor.

By using such an extinction voltage measuring circuit as a reference voltage measuring circuit, possible circuit tolerances substantially do not play any role. The extinction voltage of the display tube is a magnitude which mainly determines the control of such a tube and its use as a reference voltage results in an automatic adaptation of the supply voltage to the tube, which is also an advantage in case of possible replacement.

By determining the supply voltages for the display tube very accurately relative to the extinction voltage thereof, transistors of types which are not resistant to high voltage such as, for example, MOS types may be used for switching on and switching off the discharge trajectories. Use of integrated circuits for control circuits thus becomes quite possible.

The invention will now be described with reference to the accompanying drawing of a preferred embodiment of the invention.

The drawing comprises a sole FIGURE showing a diagram of a visual display apparatus according to the invention.

In the FIGURE a gas discharge display tube 1 has a common anode 3 which is coupled to an anode control circuit 5 receiving a supply voltage from an output 7 of a bias control circuit 9.

The gas discharge display tube 1 has an auxiliary system of anodes comprising a plurality of auxiliary anodes 11, 13, 15 and a cathode system having a plurality of cathodes 17, 19, 21, 23, 25, 27, 29, 31, 33, 35, 37, 39, 41, 43 and 45. The cathodes 17, 27, 37; 19, 29, 39; 21, 31, 41; 23, 33, 43 and 25, 35, 45 are interconnected in groups. Each group is connected to outputs 47, 49, 51, 53, 55, respectively, of a further control circuit 57. This further control circuit 57 is coupled to the anode control circuit 5. This is symbolically denoted by a connection 59.

The auxiliary anodes 11, 13 and 15 are coupled through capacitors 61, 63 and 65 to outputs 67, 69 and 71 of the further control circuit 57 and through diodes 73, 75 and 77 to a resistor 79 which in turn is connected to an output 81 of the bias control circuit 9.

Furthermore the gas discharge display tube 1 includes an extinction voltage measuring electrode system 83, 85, 87 which is connected to an input 89 of an extinction voltage measuring circuit 91 coupled to the bias control circuit 9.

The input 89 of the extinction voltage measuring circuit 91 is connected to the cathode of a diode 93 whose anode is connected to a capacitor 95, the other end of which is connected to ground. The anode of the diode 93 is furthermore connected to a resistor 97 which is connected to the positive terminal of a supply voltage source 101 whose negative terminal is connected to ground. The connection between the diode 93 and the capacitor 95 is connected through a zener diode 103 to the base of an npn transistor 105 arranged as an emitter follower.

The output 81 of the bias circuit 9 is connected to the emitter of the transistor 105 and to the base of an npn transistor 107 whose collector is connected to the positive supply voltage and whose emitter is connected to the emitter of an npn transistor 109 and through a resistor 111 to ground.

The collector of the transistor 109 is connected through a resistor 113 to the positive supply voltage and is furthermore connected to the base of an npn transistor 115 arranged as an emitter follower whose emitter is connected to the output 7 and is furthermore connected to ground through a smoothing capacitor 116. The base of the transistor 109 is connected to a tap on a potential divider 117, 119 connected between the emitter of the transistor 115 and ground.

The operation of the circuit arrangement is as follows.

The cathodes 17, 19, 21, 23, 25 are assumed to be associated with a first character position, the cathodes 27, 29, 31, 33 and 35 are assumed to be associated with a second character position and the cathodes 37, 39, 41, 43 and 45 are assumed to be associated with a third character position. Upon energizing a character or a figure each of the cathodes may display, for example, a digit, character, punctuation mark or a part (segment) of a character or a figure.

Furthermore the auxiliary anode 11 and the extinction voltage measuring electrode 83 are associated with the first character position, the auxiliary anode 13 and the extinction voltage measuring electrode 85 are associated with the second character position and the auxiliary anode 15 and the extinction voltage measuring electrode 87 are associated with the third character position.

To cause a character in one of the character positions to light up, the anode 3 is connected by means of the anode control circuit 5 to the positive voltage of the output 7, while the cathodes associated with the character positions are selectively connected to ground in a desired configuration and a positive pulse is applied to the relevant auxiliary anode by means of the further control circuit 57. This positive pulse is only to supply energy for the relevant auxiliary anode due to blocking of the relevant diode of the diode circuit 73, 75, 77. A gas discharge then occurs which causes the relevant cathodes to light up. The relevant extinction voltage measuring electrode will assume the potential of the gas discharge plasma between the anode and the relevant cathodes during the display of a character. This potential will be higher than that at the anode of the diode 93 where the potential is determined by the charge on the capacitor 95. The diode 93 is then blocked and the voltage across the capacitor 95 will increase because it is charged up through the resistor 97.

In order to extinguish the cathodes in the relevant character position, a pulse which is negative going relative to the supply voltage at the output 7 of the bias control circuit 9 is applied to the anode 3. The gas discharge is then firstly displaced from the anode-cathode path to the path between the relevant extinction voltage measuring electrode and the cathodes so that the diode 93 starts conducting and the capacitor 95 is discharged down to the extinction voltage of the gas-discharge tube and the gas discharge is then extinguished.

Subsequently a cathode combination of a subsequent character position is connected to ground, the anode is rendered positive again and the auxiliary anode of this subsequent character position is energized with the aid of a pulse and so forth.

Due to the minimum voltage detection action of the circuit and apart from a small ripple voltage, the voltage across the capacitor 95 caused by charging during the energizing periods will be substantially equal to the extinction voltage of the gas discharge display tube 1 supplemented by the voltage drop across the diode 93. This voltage is decreased by the voltage drop across the zener diode 103 and the base-emitter voltage of the transistor 105 is brought to slightly below the extinction voltage, applied to the output 81 of the bias control circuit 9 and applied as a bias through the resistor 79 to the auxiliary anodes 11, 13, 15. Furthermore this voltage is shifted to a slightly higher value by the difference amplifier 107, 109 while maintaining the possible variations which occur in the extinction voltage and hence in the voltage at the base of the transistor 107 and which are also found back at the collector of the transistor 109 and are passed on through the emitter follower 115 to the output 7 which provides the anode bias voltage of the gas discharge display tube 1. This anode bias may be adjusted to a desired value with the aid of the resistor 119.

In the situation shown the capacitor 95 is discharged every time to the tube extinction voltage by the extinction voltage measuring electrodes. If in a further possible circuit arrangement the capacitor 95 were not connected to ground but to the positive supply voltage, it would alwasy be charged to the extinction voltage and discharged by the resistor 97. The extinction voltage measuring electrode 83, 85, 87 thus is generally arranged as a recharge electrode for the capacitor 95.

Although separate electrodes for each character position have been described in the foregoing as extinction voltage measuring electrodes, they may be, for example, wire or strip-shaped electrodes extending throughout the gas discharge display tube. It is alternatively possible, for example, for a non-used cathode to serve as an extinction voltage measuring electrode for each character position.

If a large ratio between the extinction period and the lighting period of the gas discharge display tube is admissible, a detection circuit coupled to an auxiliary anode may serve, for example, as an extinction voltage measuring circuit which detects the extinction voltage at this auxiliary anode during the extinction cycle.

Furthermore it is possible to produce a free running relaxation oscillation not coupled to the display cycle between two possibly invisibly arranged electrodes in the tube from which oscillation the extinction voltage value may be derived by means of detection.

The use of a further detection circuit may generally be desired when a large ripple voltage occurs.

If the gas discharge display tube is of a crossbar type having a satisfactory coupling between the discharge crossings, an extinction voltage measuring circuit according to the principle described may also be used.

A type using three electrode systems has been described as a gas discharge display tube. It will be evident that a circuit arrangement according to the invention may also be used for a tube employing a two-electrode system, thus with cathodes and anodes only.

I claim:

1. A visual display apparatus comprising, a gas discharge display tube including an extinction voltage measuring electrode and a system of anode and cathode electrodes arranged to define a plurality of discharge gaps within said display tube, a bias control circuit for controlling the supply voltage applied to the electrodes of the gas discharge tube, means for selectively applying the supply voltage to the tube electrodes in a sequence that is independent of the gas discharge condition across the discharge gaps between the tube electrodes, and an extinction voltage measuring circuit coupled to an input of said bias control circuit to provide a reference voltage therefor, said extinction voltage measuring circuit including a capacitor coupled to said extinction voltage measuring electrode so that the measuring electrode is arranged as a recharge electrode for the capacitor.

2. Visual display apparatus as claimed in claim 1, in which the gas discharge display tube is of a type using a cathode system, an auxiliary anode system and an anode system, cahracterized in that at least the auxiliary anode system is coupled to an output of the bias control circuit.

3. Visual display apparatus as claimed in claim 1, characterized in that the extinction voltage measuring circuit is coupled to a separate extinction voltage measuring electrode provided in the gas discharge tube and extending substantially throughout the tube.

4. Visual display apparatus as claimed in claim 1 further comprising a discharge circuit for the capacitor that includes a diode coupling the capacitor to the extinction voltage measuring electrode so that the diode, capacitor and discharge circuit are arranged as a minimum voltage detection circuit.

5. A visual display apparatus comprising, a gas discharge tube including a system of anode and cathode electrodes arranged to define a plurality of discharge gaps within said display tube and an auxiliary electrode, a bias control circuit for adjusting the value of the supply voltage applied to the electrodes of the display tube as a function of a control signal at the input of the bias control circuit, means for selectively applying the supply voltage to the display tube system of anode and cathode electrodes as a function of the information to be displayed, a reference voltage measuring circuit having an input terminal connected to said auxiliary electrode and an output coupled to the input of the bias control circuit, said measuring circuit including a capacitor coupled to its input terminal and circuit means whereby the value of the display tube extinction voltage acts as a reference voltage for determining the value of the control signal developed at the output of the measuring circuit and hence the value of the supply voltage applied to the tube electrodes.

6. A visual display apparatus as claimed in claim 5 further comprising a diode connected in circuit to couple the capacitor to said input terminal and polarized to provide a discharge path for the capacitor that includes the auxiliary electrode and at least one cathode electrode of the display tube.

7. A visual display apparatus as claimed in claim 5 further comprising a diode connected in series with the capacitor to said input terminal and polarized to provide a discharge path for the capacitor that includes the auxiliary electrode and at least one cathode electrode of the display tube, a source of DC voltage, and a charge circuit coupling the capacitor to the DC voltage source.

8. A visual display apparatus as claimed in claim 5 wherein the display tube includes an auxiliary anode system coupled to an output of the bias control circuit.

9. A visual display apparatus comprising, a gas discharge tube including a system of anode and cathode electrodes arranged to define a plurality of discharge gaps within said display tube and an auxiliary electrode, a bias control circuit with an output for applying a supply voltage to the anode-cathode electrodes of the display tube and a control input for adjusting the value of the supply voltage as a function of a control signal applied thereto, switching means for selectively coupling the output of the bias control circuit to the tube anode-cathode electrodes independent of the discharge state of the electrode discharge gaps, a reference voltage measuring circuit having an input terminal connected to said auxiliary electrode and an output coupled to the control input of the bias control circuit, and said measuring circuit including circuit means for controlling the value of a reference control signal developed at the output of the measuring circuit as a function of the voltage at the tube auxiliary electrode.

10. A visual display apparatus as claimed in claim 9 wherein said measuring circuit means includes a capacitor coupled to its input terminal.

11. A visual display apparatus as claimed in claim 9 wherein said circuit means includes a capacitor and diode connected in series to said measuring circuit input terminal.

12. A visual display apparatus as claimed in claim 15 wherein said circuit means further comprises a voltage breakdown element coupled between the junction of the capacitor and diode and the output of the measuring circuit.

13. A visual display apparatus as claimed in claim 10 wherein said display tube includes an auxiliary anode system and said bias control circuit includes a second output coupled to said auxiliary anode system for applying a supply voltage thereto determined by the control signal at the input of the bias control circuit.

14. A visual display apparatus as claimed in claim 9 wherein said display tube includes a single anode and a plurality of cathodes arranged to define said plurality of discharge gaps within the display tube.

* * * * *